Oct. 22, 1968　　　W. A. HUNTER　　　3,406,738
AUTOMATIC MATCHPLATE MOULDING MACHINE
Original Filed Nov. 16, 1964　　　10 Sheets-Sheet 1

INVENTOR
WILLIAM ALLAN HUNTER
BY
Richard L. Lindberg
ATTORNEY

Oct. 22, 1968     W. A. HUNTER     3,406,738
AUTOMATIC MATCHPLATE MOULDING MACHINE
Original Filed Nov. 16, 1964     10 Sheets-Sheet 3

INVENTOR
WILLIAM ALLAN HUNTER
BY
*Ред T. Lindberg*
ATTORNEY

Oct. 22, 1968 W. A. HUNTER 3,406,738
AUTOMATIC MATCHPLATE MOULDING MACHINE
Original Filed Nov. 16, 1964 10 Sheets-Sheet 4

INVENTOR
WILLIAM ALLAN HUNTER
BY
ATTORNEY

Oct. 22, 1968 W. A. HUNTER 3,406,738
AUTOMATIC MATCHPLATE MOULDING MACHINE
Original Filed Nov. 16, 1964 10 Sheets-Sheet 5

INVENTOR
WILLIAM ALLAN HUNTER
BY
*Ans. Lindberg*
ATTORNEY

Oct. 22, 1968  W. A. HUNTER  3,406,738
AUTOMATIC MATCHPLATE MOULDING MACHINE
Original Filed Nov. 16, 1964  10 Sheets-Sheet 6
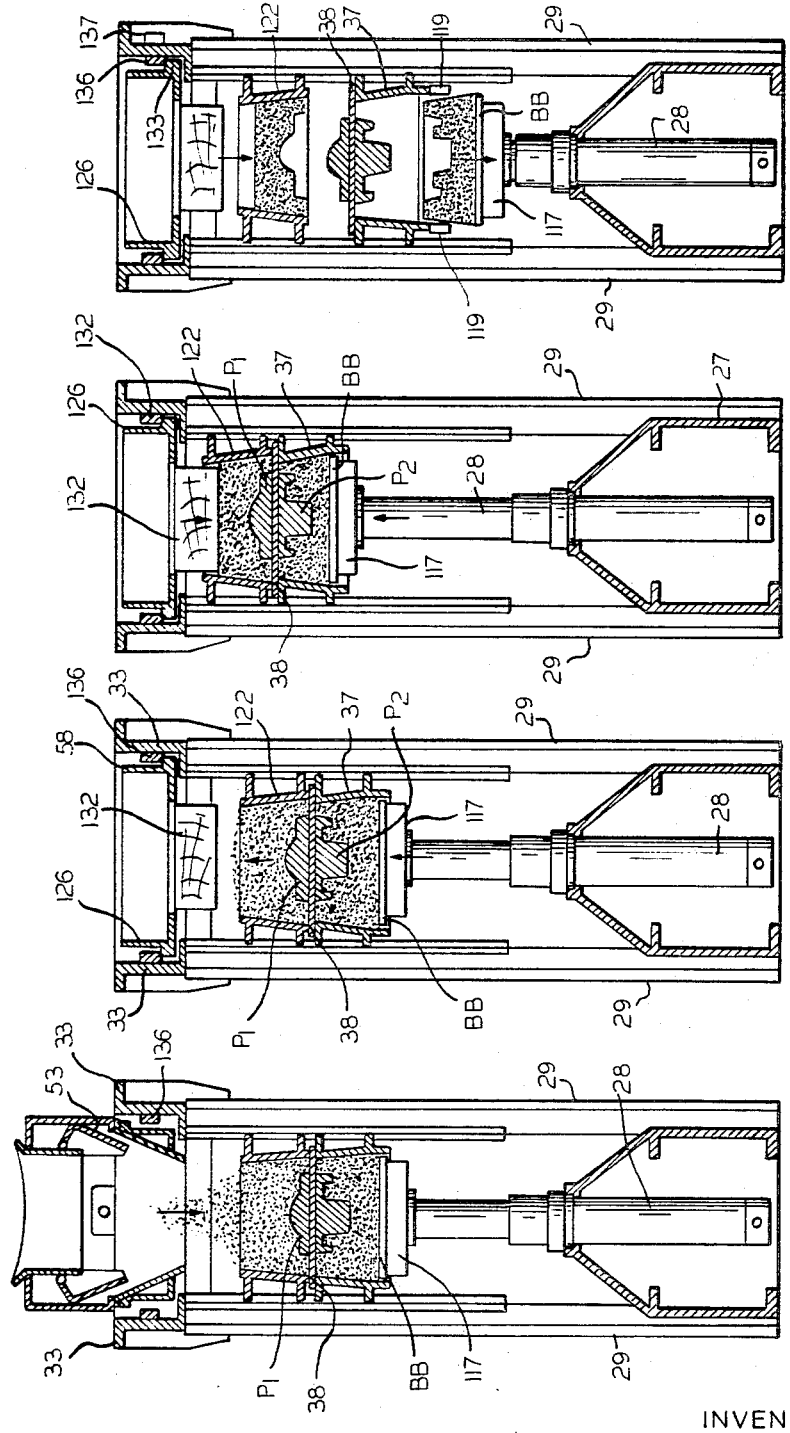

Oct. 22, 1968  W. A. HUNTER  3,406,738
AUTOMATIC MATCHPLATE MOULDING MACHINE
Original Filed Nov. 16, 1964  10 Sheets-Sheet 7

INVENTOR
WILLIAM ALLAN HUNTER
BY
ATTORNEY

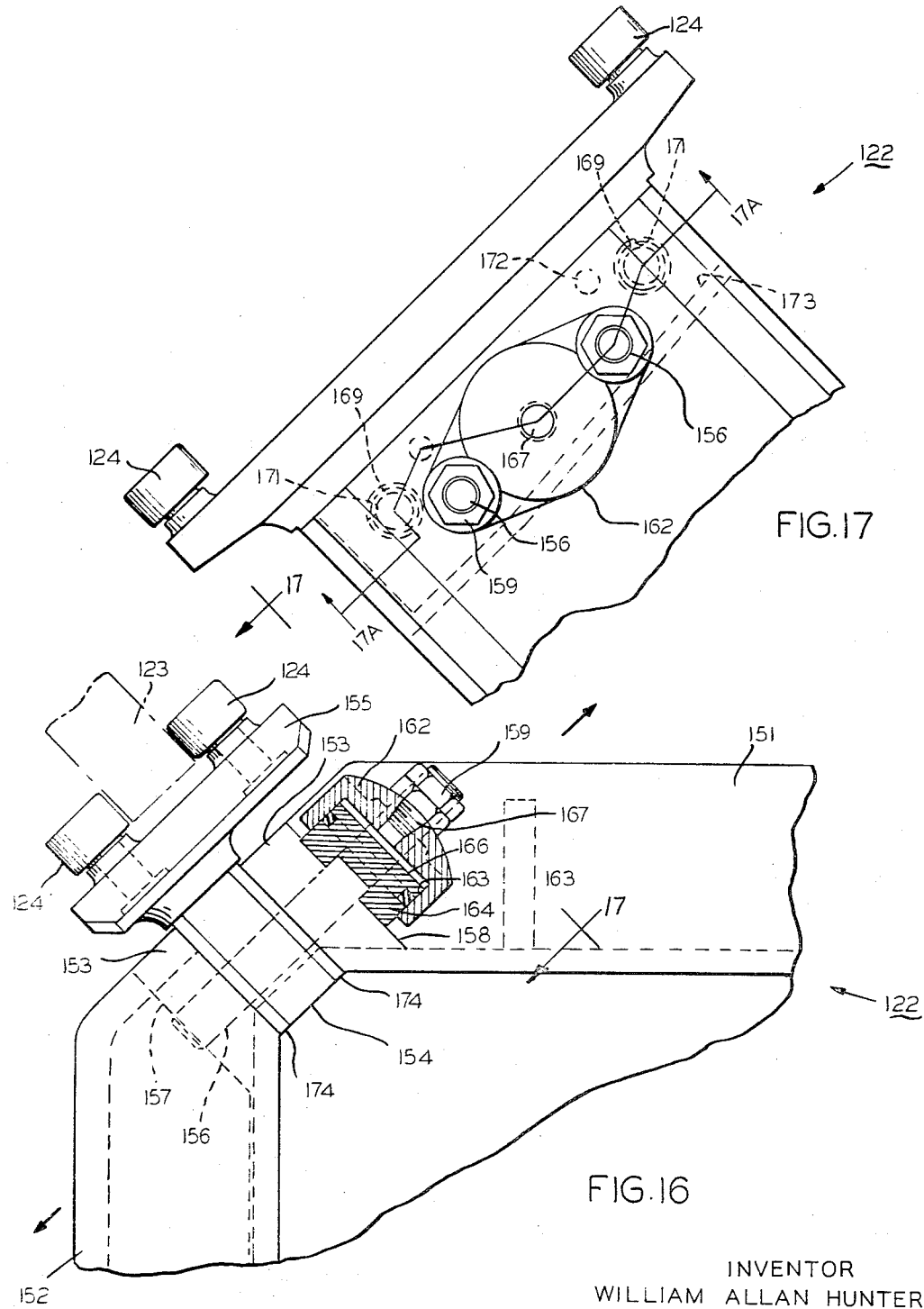

Oct. 22, 1968 W. A. HUNTER 3,406,738
AUTOMATIC MATCHPLATE MOULDING MACHINE
Original Filed Nov. 16, 1964 10 Sheets-Sheet 9

INVENTOR
WILLIAM ALLAN HUNTER

BY
*Ro. T. Lindberg*
ATTORNEY

United States Patent Office 3,406,738
Patented Oct. 22, 1968

3,406,738
AUTOMATIC MATCHPLATE MOULDING
MACHINE
William Allan Hunter, Morton Grove, Ill., assignor to
Heatherwill Company, Morton Grove, Ill., a partnership
Continuation of application Ser. No. 411,538, Nov. 16,
1964. This application Apr. 6, 1967, Ser. No. 633,661
25 Claims. (Cl. 164—182)

An apparatus and method for matchplate moulding wherein an inverted drag flask is filled against a matchplate at a first station and closed, subsequently erected and transferred to a second station where the filled and erect drag flask is moved against a cope flask with the matchplate therebetween for filling of the cope flask and compacting the moulding sand within both flasks. The apparatus and method includes separating the erect and filled drag flask from the filled cope flask, separating the drag flask from its drag mould and moving the drag mould against the cope mould and releasing the latter from its flask to provide a completed mould.

This application is a continuation of Hunter application Ser. No. 411,538, filed Nov. 16, 1964, now abandoned, for Automatic Matchplate Moulding Machines.

The present invention has for its particular object the making of a sand mould in an automatic process and structure employed therein for making a drag mould while in an inverted position at a first station, for turning the drag flask with its mould over at such station, so that the matchplate is at the top of the drag flask, for moving the drag flask and its mould to a second station into register with a cope flask adapted to be filled at such second station while in a position atop the filled drag flask.

The above described preliminary steps of moulding are completed by moving a squeeze head over the cope and drag flasks and exerting a compacting force on both the cope and drag moulds therein. After such compaction of the mould at the second station, the drag flask and drag mould are removed from the cope flask and cope mould, the drag flask and matchplate being subsequently separated from the drag mould and returned to the first station for refilling. After such separation of the drag flask and matchplate from the drag mould, the drag mould is moved against the cope mould and lightly engaged therewith, while the cope flask is opened, the cope and drag moulds being then joined and delivered from the machine.

With the foregoing considerations in mind it is a principal object of the invention to provide an automatic moulding machine characterized by the use of a matchplate, and having a first station where a drag flask is placed in inverted position atop the matchplate and moulding sand is delivered thereto and struck off, and wherein structure is provided for turning the filled drag flask and matchplate through 180°, and transferring the filled drag flask to a second station for cooperation with a cope flask resting upon the matchplate to prepare a cope mould within the cope flask.

Another object is to provide a movable carriage for such machine, and having a first position where filling of the cope is accomplished, and a second position where compaction of the drag and cope moulds is accomplished.

Still another object is to provide a moulding sand hopper cooperating with the movable carriage, and operable when the carriage is in a first position to discharge a metered batch of moulding sand to the inverted drag flask, and further operable when the carriage is in the first position to deliver a metered batch of sand to a carriage mounted hopper for movement therewith to a second position to discharge into the cope flask.

A further object is to provide in a machine of the class contemplated, a drag flask and matchplate capable of assuming a first inverted position for filling with moulding sand, and a bottom board adapted to close the bottom of the drag flask after filling, and to be clamped thereto prior to rotating to a second upright position, the drag flask, matchplate and bottom board in such upright position being subsequently transferred to a second station for cooperation with a to be filled cope flask to complete a moulding operation.

It is an ancillary object to provide structure for holding a stack of such bottom boards and to enable the bottommost board to be moved free from friction of the overlying boards to strike off the filled drag flask.

It is a final object of the invention to provide an efficient machine for accomplishing matchplate moulding, and in a structure which is exceedingly compact, relatively simple to manufacture, and easy to operate.

Other objects and important features of the invention will become apparent from a study of the specification following taken with the drawings which together describe and illustrate a preferred embodiment of the structure for carrying out the invention, as well as steps taken by the structure for making a finished mould. Other embodiments of the invention may be suggested to those having the benefit of the teachings herein, and such other embodiments are intended to be reserved especially as they fall within the scope and purview of the subjoined claims.

In the drawings which illustrate the structure according to the present invention, and the steps taken in use of said structure to prepare a finished mould:

FIG. 8 is an end view of the apparatus seen in FIG. 7, and showing the metering hopper movable with the fill carriage as having delivered a metered quantity of moulding sand to the cope flask;

FIG. 9 is a view similar to FIG. 8, but showing the fill carriage retracted to a position where a squeeze head carried thereby is in position atop the filled cope flask;

FIG. 10 is a view similar to FIG. 9, but showing the pressure ram having raised the slip flask including the cope flask and drag flask and matchplate into position against the squeeze head, and thus having compacted the mould by squeezing between the platen and the squeeze head;

FIG. 11 is a view similar to FIG. 10 but showing the ram retracted with the filled cope flask moved to a stop position, the drag flask and matchplate withdrawn to a lower stop position for subsequent removal, and the drag mould withdrawn from the drag flask;

FIG. 16 is a fragmentary plan view of a corner of the cope flask, showing releasable structure for clamping the cope flask sides and ends firmly together, and for release of the same to free a cope mould therein;

FIG. 17 is a side view looking in the direction of the arrows 17—17 of FIG. 16, showing details of structure for aligning and opening the corners of the cope flask;

Figure 1:
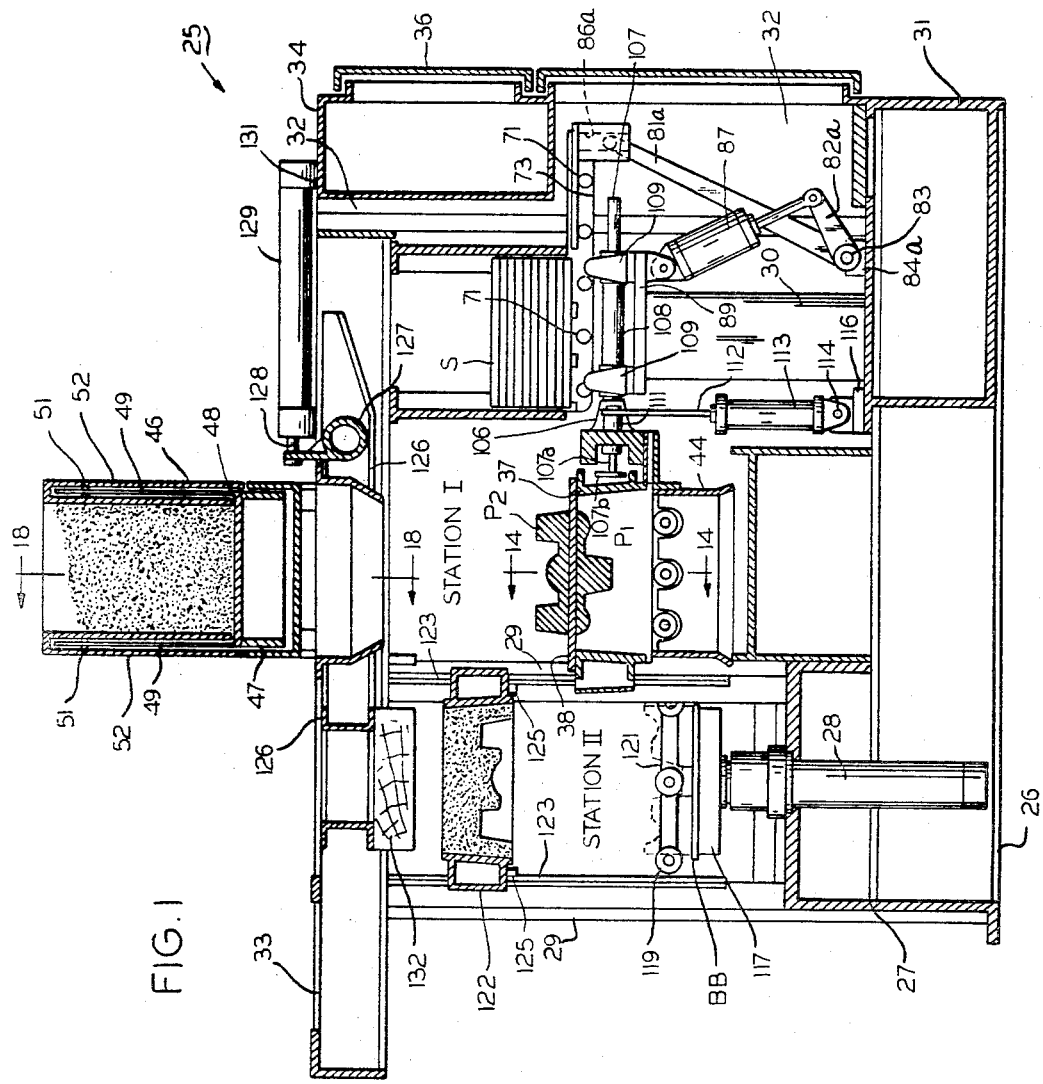
FIG. 1 is a longitudinal elevational view showing somewhat schematically an automatic moulding machine having the improvements according to the present invention embodied therein, certain parts being shown in section, and showing the apparatus at the start of a new moulding cycle, and at the completion of a previous moulding cycle.

Referring now particularly to FIGS. 1 to 7 of the drawings, the improved moulding machine according to the present invention is referred to generally by reference numeral 25, and consists of a base frame 26 supporting a stage 27 for a ram device 28, there being corner frame members 29 extending upward from the stage 27. The base 26 also forms a support for an oil reservoir 31 containing a supply of hydraulic oil for operation of various hydraulic motors, as will be described in more detail. A pair of vertical members 30 and 32 flank the oil reservoir 31, and extend upward from the base 26. The upper ends of the corner frame members 29 and the vertical members 30 and 32 have Z-shaped upper frame members 33 secured thereto. The vertical frame members 32 also provide a support for a cabinet 34 having a closure 36, the cabinet 34 enclosing various control mechanisms merely incidental to the present invention.

The matchplate moulding machine according to the present invention, can be considered broadly as having a first moulding station denoted Station I for filling an inverted drag flask, and a second moulding station denoted Station II for receiving the erect and filled drag flask from Station I, for filling a cope flask, placing pressure against the filled drag and cope flasks, subsequently separating the filled flask from the filled cope flask, separating the drag flask from the drag mould, and finally lightly pressing the drag mould against the cope mould while the same is released from the cope flask to provide a finished mould at Station II.

Figure 2:
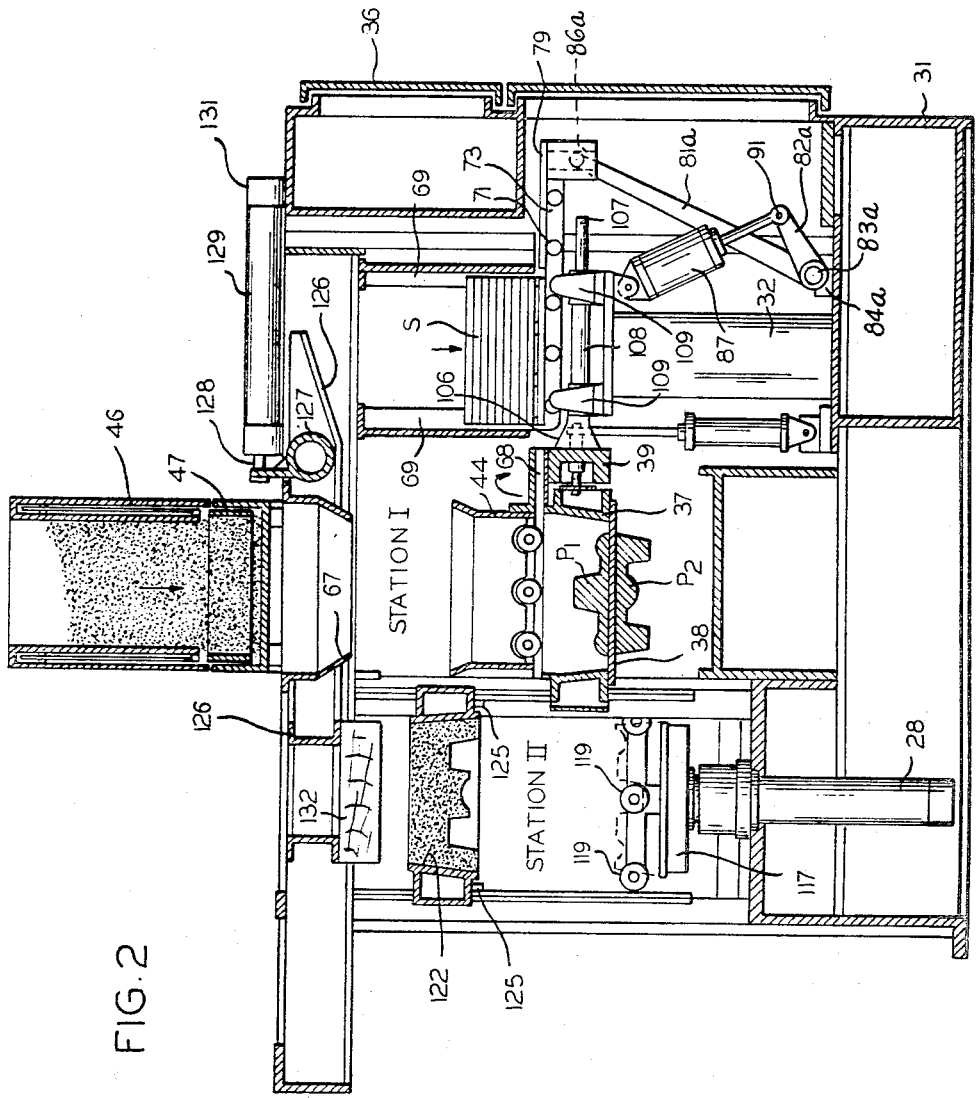
FIG. 2 is a view similar to FIG. 1, and showing the start of a moulding cycle, and showing a previously prepared drag mould on a pressure platen ready to move against a cope mould in the cope flask, and subsequently to a position to be removed from the apparatus.
Figure 7:
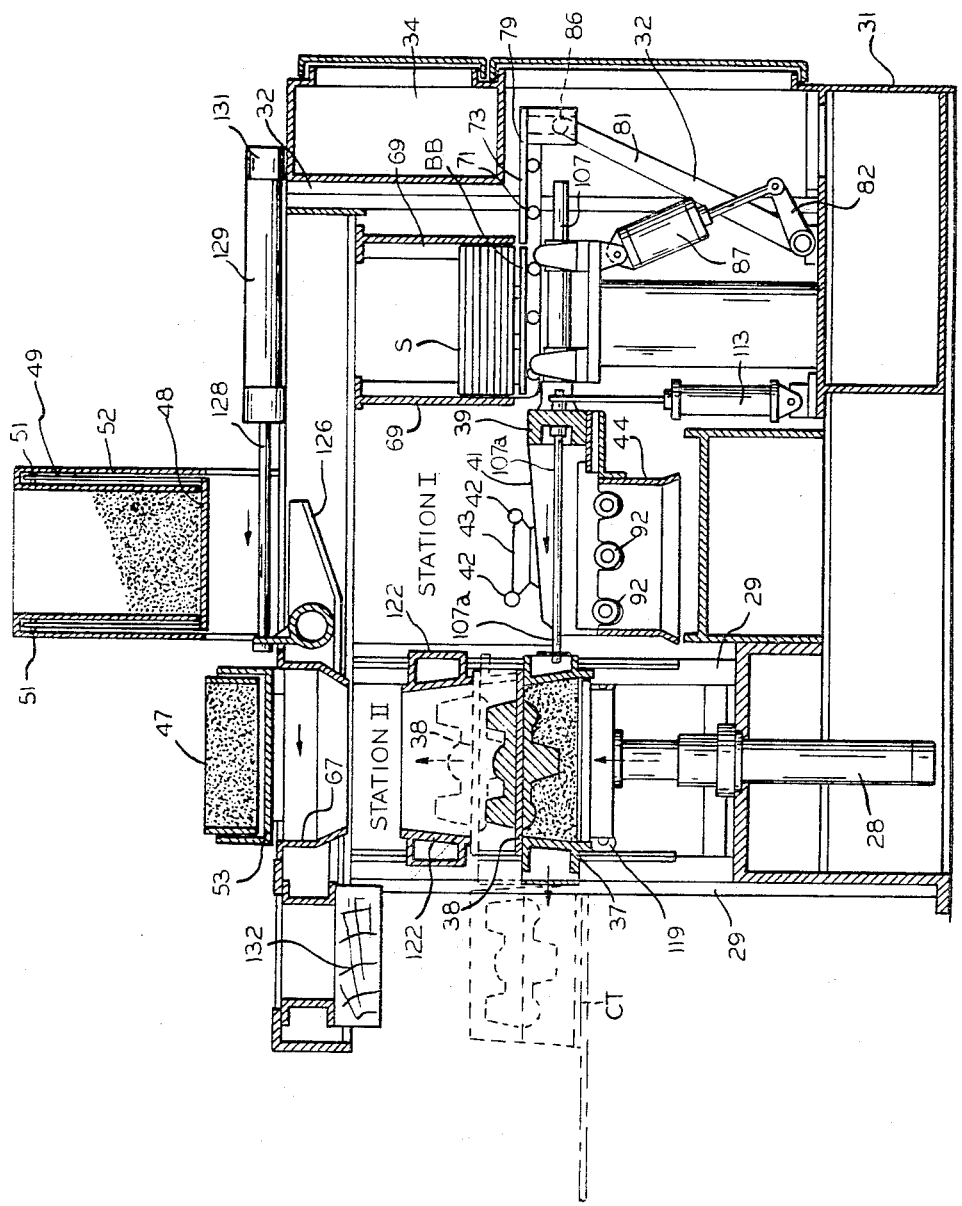
FIG. 7 is a view showing the filled drag flask and matchplate ready to be moved into position against the cope flask for the filling thereof, the mechanism for placing the filled drag flask on the platen having been extended, and the fill carriage for filling the cope flask being in position atop the cope flask for delivering a metered quantity of moulding sand thereto.
Figure 14:
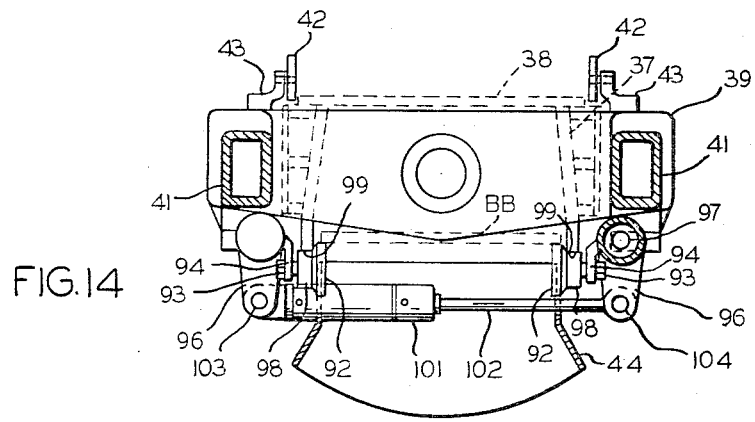
FIG. 14 is a transverse section taken along the line 14—14 of FIG. 1 showing details of mechanism for supporting the drag flask and the bottom board for movement on to the pressure platen seen in FIG. 1.

Referring now particularly to FIG. 2, Station I has located thereat an inverted drag flask 37 having a matchplate 38 secured thereto in any convenient fashion. Matchplate 38 is provided with pattern halves $P_1$ and $P_2$, and the drag flask 37 is arranged to be held in a yoke or rollover device 39 having a pair of spaced arms 41 to embrace the sides of the drag flask 37, as seen in FIG. 14, which shows the drag flask 37 in upright or erect position, and as seen also in FIG. 2 wherein the drag flask 37 is in its inverted position. The drag flask 37 is adapted to rest in inverted position upon rollers 42 mounted for free turning on brackets 43 secured in any convenient manner to the spaced arms 41 of the rollover device 39. One of the brackets 43 and the rollers 42 mounted thereon are also shown in FIG. 7, wherein drag flask 37 has been delivered from Station I, after having been filled, to Station II.

Referring back again to FIG. 2, wherein the drag flask 37 is in its inverted position for filling, the yoke or rollover 39 supports a chute 44 surmounted thereon, chute 44 lying under a filling hopper 46 for the moulding sand. The moulding sand is adapted to fall by gravity into a metering hopper 47, see also FIG. 18. Fill hopper 46 is provided with a swing gate 48 at the bottom thereof, swing gate 48 being suspended from spaced arms 49 swiveling on pins 51 in paired side walls 52 of the hopper 46.

Figure 18:
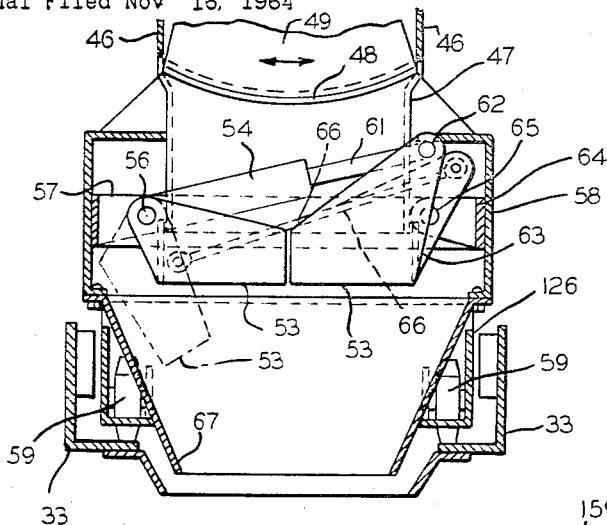
FIG. 18 is a detailed cross sectional view taken substantially along the line 18—18 of FIG. 1 looking in the direction of the arrows, showing the main supply hopper in its relationship to the metering hopper of the fill carriage, showing the hopper gates of the hopper in closed position.
Figure 19:
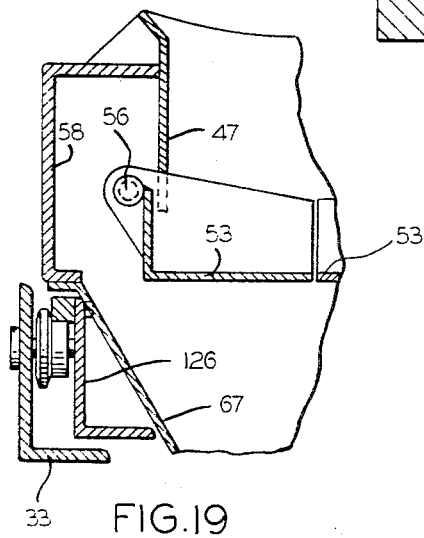
FIG. 19 is a detailed transverse sectional view through the metering hopper of the fill carriage, showing the gates thereof closed and in a position for movement of the fill carriage to a position to discharge into the cope flask.

The swing gate 48 is adapted to be swung to one side or the other as seen in FIG. 18 to discharge into the metering hopper 47 which has a bottom defined by metering hopper gates 53, see FIGS. 18 and 19. It will be understood that suitable power means, not shown, are provided for operating the swing gate 48 so that the fill hopper 46 can discharge to the metering hopper 47.

Gates 53 are operated by a power cylinder pivotally anchored at 56 to a bracket 57 extending inward from a carriage hopper 58, see FIGS. 18 and 19, mounted on wheels 59 adapted to roll on the upper frame members 33, see also FIGS. 8 and 9. Power cylinder 54 has a piston rod 61 pivotally connected at 62 to an operator 63 flanking one of the gates 53 and secured thereto, the said one gate 53 being pivoted at 65 to a bracket 64 extending inward from the other side of the carriage hopper 58.

The other gate 53 is pivoted at 56, and is connected by an operator link 66 pivoted at each end to a gate 53. It will be seen that when piston rod 61 is retracted, the gates 53 will rock to open position, the moulding sand in the metering hopper 47 dropping by way of a chute 67 made part of the carriage hopper 58 and overlying the drag flask as seen in FIG. 2.

Figure 3:
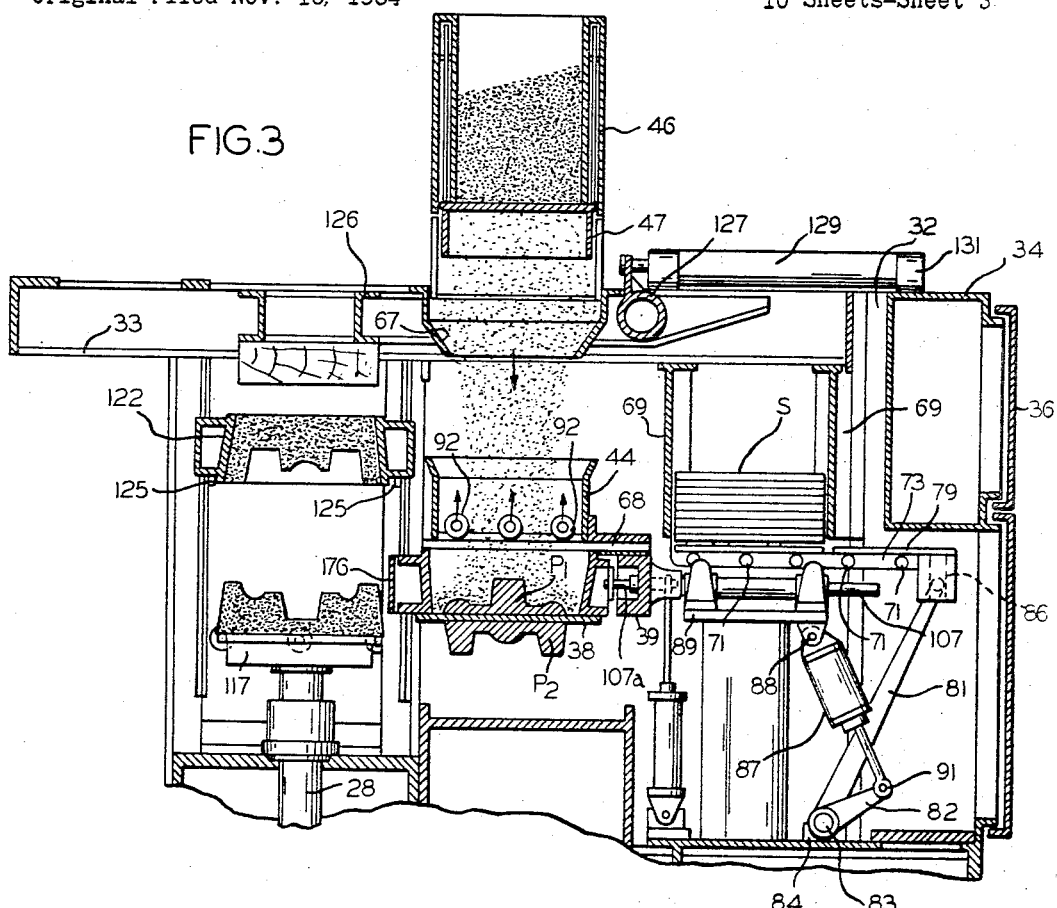
FIG. 3 is a view similar to FIGS. 1 and 2, showing the start of the filling of the inverted drag flask, with the matchplate positioned on the bottom thereof.

As seen now in FIGS. 2 and 3, a charge of moulding sand is dropped by gravity from the metering hopper 47 into the chute 44 surmounting the drag flask 37 to fill the drag flask 37. Suitable vibrating means, not shown, is provided for vibrating the drag flask 37 to insure good compaction of the sand against pattern $P_1$.

Structure is provided for striking off the drag flask 37 after it is filled with sand, and for subsequently erecting the drag flask 37 by operation of the rollover device 39. To this end a slot 68 is provided in the rollover device 39 for the passage of a bottom board BB. A hopper 69 is provided for a stack S of said bottom boards, and structure is provided for advancing the bottommost board BB from the stack S thereof to a position atop the inverted drag flask 37.

Figures 12, 13:
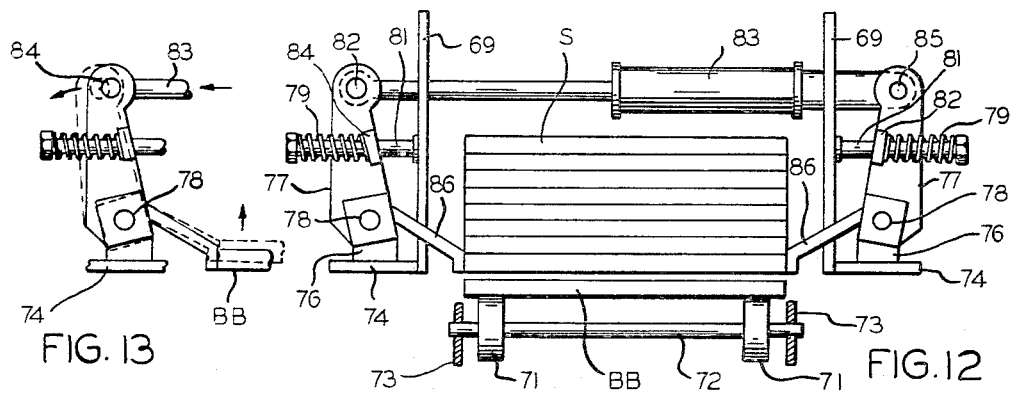
FIG. 12 is an enlarged detailed end view of apparatus for feeding a bottom board onto the inverted drag flask seen in FIGS. 2 to 4 inclusive.
FIG. 13 is a detailed end view of one of the holding members for the bottommost board of the bottom board pile, showing the deformation taken thereby in the lifting of the pile of bottom boards commencing with the board immediately above the bottommost board.

As seen particularly in FIG. 12, the bottommost board BB is adapted to rest upon spaced rollers 71 supported on idler shafts 72 supported at their ends in spaced frame members 73. Structure is provided for lifting a slight amount all but the bottommost board, so that the same can be advanced with a minimum of effort into position over the filled drag flask 37 at the same time striking off any excess sand therein. To this end, the sides of the hopper 69 have feet 74 extending therefrom which in turn support brackets 76 having rock arms 77 fast to shafts 78, each shaft 78 being journaled in the bracket 76. Each rock arm 77 is normally biased in the directions seen in FIGS. 12 and 13, normally tending to release engagement with the boards in hopper 69. Such bias is accomplished by a spring 79 guided on long cap screws 81 tapped into the sides of the hopper 69 and constrained between an abutment 82 and the head of each cap screw 81. An expansible fluid motor 83 is mounted between the upper ends of the rock arms 77, being pivotally connected therebetween at 84 and 85. Each of the rock arms has a board engaging finger 86 adapted to engage the next one to the bottommost board upon expansion of fluid motor 83.

Upon extra force from the fluid motor 83 the parts are strained slightly as seen in FIG. 13 in the dotted outline, to provide an additional rocking effect to the board engaging fingers 86 to lift the entire stack S, except for the bottommost board BB.

Figure 4:
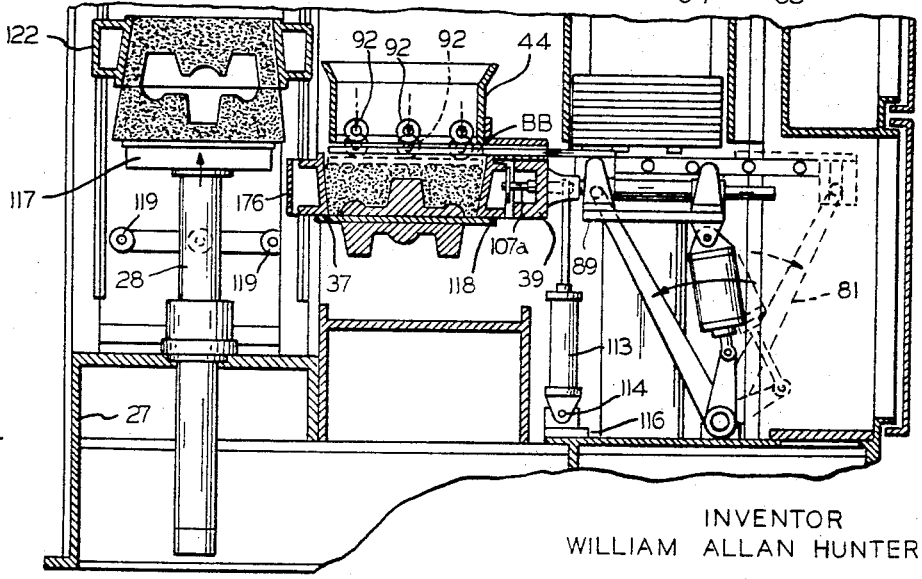
FIG. 4 is a view similar to FIG. 3 showing the completion of the filling of the drag flask and the movement of a bottom board into position atop the inverted drag flask and the final closing of the previously made cope and drag moulds.

Structure is provided for advancing the bottommost board into position atop the inverted and filled drag flask 37, and consists of a slide 79 supported on the rollers 71, and moved by rock arms 81a and 82a fast on a stub shaft 83a supported on an abutment 84a. The free end of rock arm 81a is guided within a yoke 86a at the end of slide 79, and the slide 79 is moved to a position to push bottom board BB atop the inverted flask 37, as seen in FIG. 4, by means of a fluid motor 87 pivoted at 88 to the underside of a table 89 extending from the vertical frame member 30, and pivoted at 91 to the free end of rock arm 82a.

In so moving to the position atop the inverted flask 37, bottom board BB has the function of striking off the excess of moulding sand from the flask 37 whereupon bottom board BB is in position to be clamped thereto.

Structure is provided for clamping the bottom board BB which has been advanced by the slide 79 to a position atop the inverted drag flask 37 after the slide 79 has been retracted and has resumed the position seen in FIGS. 2 and 3. To this end, and as seen with particular reference to FIGS. 4 and 14, the bottom board BB is adapted to be held along its side edges by clamping rollers 92, each being mounted on stub shafts 93 supported in brackets 94 extending from rock arms 96. These are pivotally supported on the yoke arms 41 at 97.

The stub shafts 93 also support rollers 98 flanking the bottom board engaging rollers 92, and adapted to engage the rim 99 of the drag flask 37. The rock arms 96 are actuated to a position to clamp the bottom board BB in place by pressure of the rollers 92 thereagainst, and to clamp the rollers 98 against the rim 99 of the drag flask 37. To this end a cylinder 101 having a piston rod 102 is connected between the two rock arms 96. The cylinder 101 is pivotally connected at 103 to the left rock arm seen in FIG. 14, while the piston rod 102 is pivotally connected at 104 to the right hand rock arm 96 seen in said figure.

It should be borne in mind that the showing of the filled drag flask 37 in FIG. 14 is after the yoke 39 has been rotated through 180°. Such rotation of the filled drag flask 37 takes place prior to the removal of same from Station I to a position atop the ram 28 at Station II.

Structure is accordingly provided for rotating the filled drag flask 37 to an erect position, and to this end the yoke 39 has a trunnion 106 extending therefrom, it turning upon the outside of a long cylinder 107 held in a long sleeve 108 supported in spaced standards 109 extending upward from the table 89.

Figure 5:
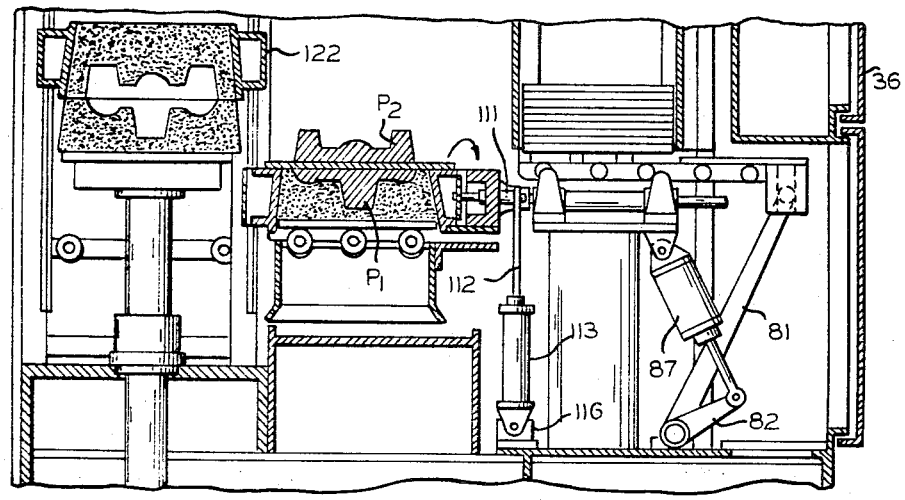
FIG. 5 is a view similar to FIG. 4 showing the bottom board feeding mechanism in retracted position, and the filled drag flask turned through 180° to an upright position.

The yoke 39 together with the filled drag flask 37, as has been previously described, is adapted to be rotated through 180° from the position seen in FIG. 2 after being first filled as seen in FIG. 3, compacted and covered with the bottom board BB as seen in FIG. 4, and rotated through the said 180° to the rollover position seen in FIG. 5. The yoke 39 accordingly has a crank 111 extending therefrom pivotally connected to a piston rod 112 of a rollover cylinder 113. Such rollover cylinder is hingedly connected at 114 to an abutment 116 extending upward from the top of the oil reservoir 31.

After the rollover operation has been accomplished by rollover cylinder 113, and the parts are in the position seen in FIG. 5, the filled drag flask 37 is adapted to be pushed onto a platen 117, part of the ram assembly 28 at Station II. This is accomplished by a piston rod 107a moving within the cylinder 107 which in turn is supported within the long sleeve 108. The cylinder 107 is of a double acting type, and has a piston, not shown, adapted to receive pressure fluid selectively on both sides thereof.

Figure 21:
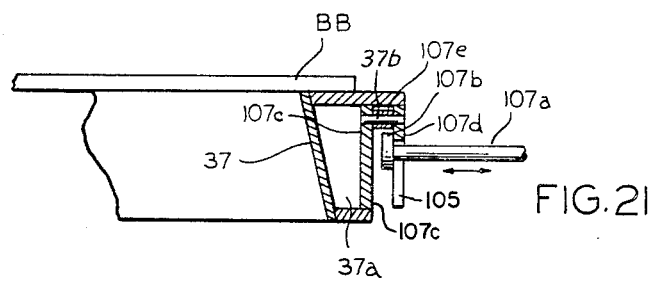
FIG. 21 is a detailed view showing how the push rod is connected to the drag flask for movement thereof to the platen and for return to the filling station.
Figure 22:
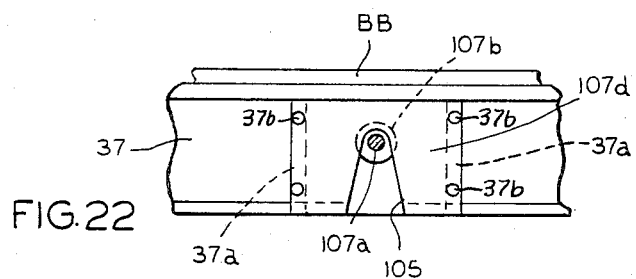
FIG. 22 is an elevation view of FIG. 21.

As seen in FIGS. 21 and 22, the piston rod 107a has a disk 107b of larger diameter at the end thereof adapted to bear against a pusher plate 107c secured to drag flask 37 when the same is moved to the left to Station II, and to bear against a slotted pull plate 107d when the drag flask 37 is pulled to the right from Station II and back to Station I, as will appear.

Plates 107c and 107d are held in spaced relationship by spacers 107e, and the assembly consisting of the plates 107c and 107d and spacers 107e are held to spaced ribs 37a of drag flask 37 by fastening screws 37b. As seen in FIG. 22 particularly, pull plate 107d has a slot 105 therein so that the filled drag flask 37 can be lifted out of engagement with the piston rod 107a when the drag flask 37 is at Station II and then lowered back into engagement therewith for return to Station I, as will be shown.

Structure is provided for filling a cope flask 122 which is mounted for movement along rails 123 made part of the corner frame members 29, the cope flask 122, see FIGS. 16 and 17, having rollers 124 at the corners thereof engaging the rails 123.

Figure 6:
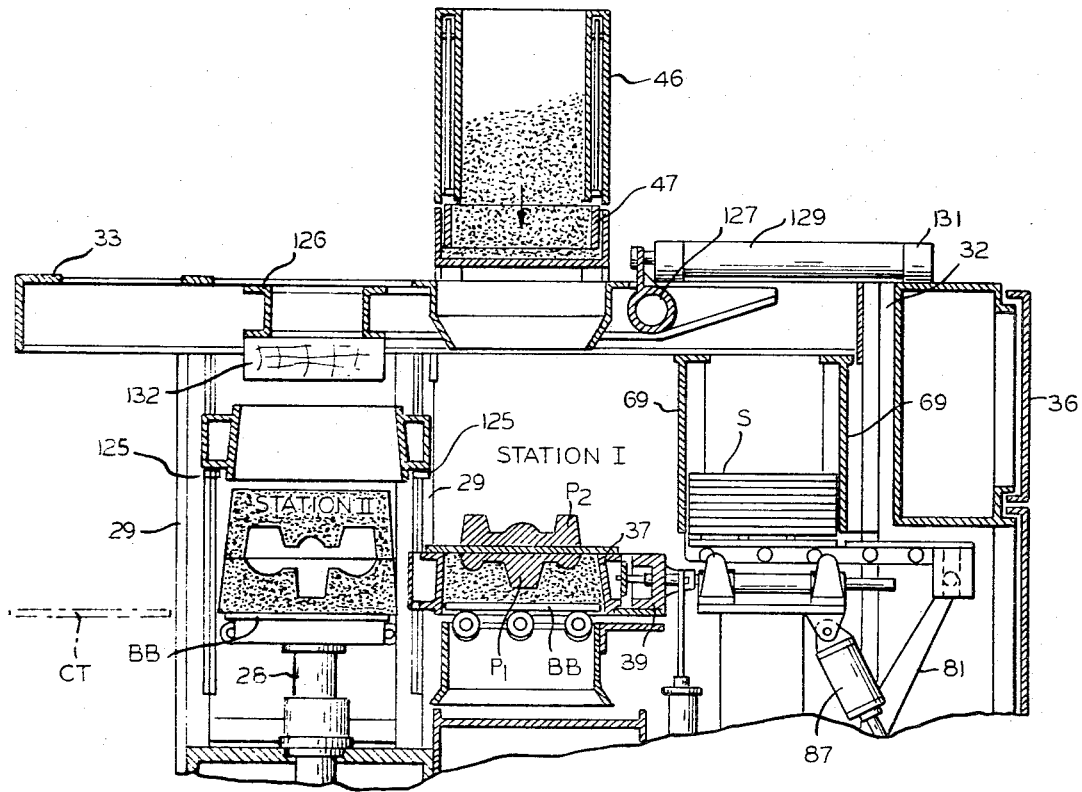
FIG. 6 is a view similar to FIG. 5 showing the filled and upright drag flask ready to be moved into position onto the platen of the pressure ram, and showing a movable fill carriage filled with a metered charge of moulding sand to fill the cope flask, and showing a completed mould in position on the platen to be pushed therefrom when the drag flask is transferred to the platen.

When the filled drag flask 37 is in position atop the platen 117 of the ram 28, the pattern $P_2$ is now uppermost as seen also in FIG. 6, and the filled drag flask is adapted to be moved into a position of register with the cope flask 122 with the pattern $P_2$ extending therewithin. The ram 28 is arranged to move the filled drag flask to such position whereupon the cope flask 122 will receive a supply of moulding sand.

Structure is provided for receiving a quantity of the moulding sand from the fill hopper 46, delivering the same to the metering hopper 47, and moving the metering hopper 47 to the position atop the cope flask 122 to fill the same. The upper frame members 33 accordingly support for longitudinal movement with respect thereto a sand car 126, see FIG. 18, it being mounted for movement on upper frame members 33 on wheels 59. The sand car 126 has a cross member 127 secured to a piston rod 128 of a car moving cylinder 129, the cylinder 129 being anchored at 131 to one of the vertical members 32. The car 126 together with the metering hopper 47 seen in FIGS. 18 and 19 is adapted to be moved to the left as seen in FIG. 7 to a position atop the cope flask 122. The ram 28 has been operated to cause the drag flask 37 and its matchplate 38 to be moved into a position of contact with the cope flask 122. When the carriage 126 has moved to a position above the cope flask 122, the hopper gates 53 seen in FIGS. 18 and 19 are opened, and a metered batch of sand moves down the chute 67 and into the cope flask 122, see also FIG. 8.

After such filling of the cope flask 122, the sand car 126 returns to the position seen in FIG. 1, where a squeeze head 132 mounted at one end thereof is in position atop the now filled cope flask 122, see also FIG. 9. As seen in FIG. 10, the ram 28 together with its platen 117, moves upward against the squeeze head 132 to consolidate the sand within the cope flask 122 and the drag flask 37 firmly against the patterns P₁ and P₂ secured to the matchplate 38.

Figure 20:
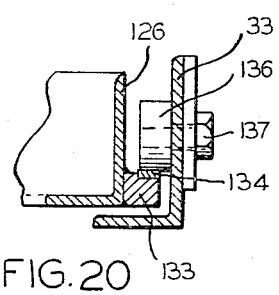
FIG. 20 is a detailed sectional view taken transverse to the frame supporting the fill carriage, and showing how the reaction against the carriage when the cope and drag flasks are in position seen in FIG. 11 are taken by the frame.

Referring now to FIG. 20, the thrust incident to the pressure exerted against the squeeze head 132 and the car 126 is taken by a reaction shoe 133 having a wear gib 134 thereon which comes into engagement with an abutment member 136 held by a cap screw 137 extending through the vertical legs of the upper side frames 33.

Figure 15:
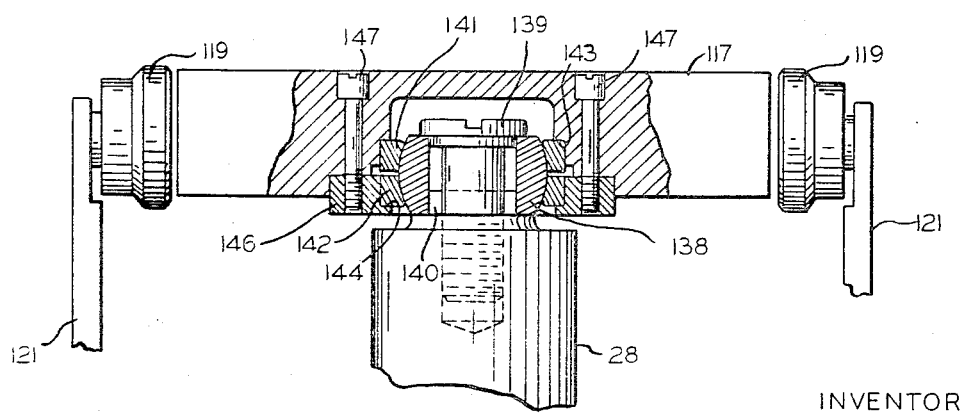
FIG. 15 is a detailed elevational view showing structure for applying pressure to the filled drag and cope flasks.

Referring now to FIG. 15, the platen 117 is mounted to the ram 28 in such a fashion as to have a slight amount of free swiveling movement to accommodate any tendency of the moulding sand to compact irregularly in the cope flask 122 and the drag flask 37. To this end the top of ram 28 has a double frusto-spherical ring 138 held to ram 28 by a cap screw 139 tapped into the top of ram 28. Ring 138 is seated around a boss 140 at the top of ram 28. Ring 138 is encircled by a pair of upper and lower bearing rings 141 and 142, upper bearing ring 141 being seated against a shoulder 143 in platen 117. Lower bearing ring 142 is seated against a shoulder 144 on a clamping ring 146, and the two rings 141 and 142 are clamped in the position seen in FIG. 15 to platen 17 by a plurality of countersunk screws 147 tapped into clamping ring 146.

Upon the completion of the compaction of the moulding sand in the cope and drag flasks as described, the filled drag flask 37 is retracted as seen in FIG. 11, the filled cope flask 122 moving downward against the stops 125. The ram 28 continues its downward movement, the drag flask 37 stopping against the rollers 119 seen also in FIGS. 4, 7, 11, and 15.

Upon the continued movement of the ram 28 downward the drag mould is removed from the drag flask 37, drag flask 37 remaining in position on the rollers 119. At such time the drag flask 37 is in position to be retrieved by the piston rod 107a of the double acting cylinder 107 seen in FIG. 1, and to be returned to its position in the yoke 39.

At this time, the drag flask 37 is returned to Station I, where it is again turned through 180° to receive another charge of moulding sand as has been previously described.

Structure is provided for moving the drag mould now perched on the bottom board BB against the now filled cope flask 122 to lightly engage the mould within the cope flask 122, so that the cope mould therewithin will rest upon the drag mould already prepared. Structure is also provided for releasing the mould within the cope flask 122 by moving the sides and ends thereof laterally of themselves.

Figure 17A:
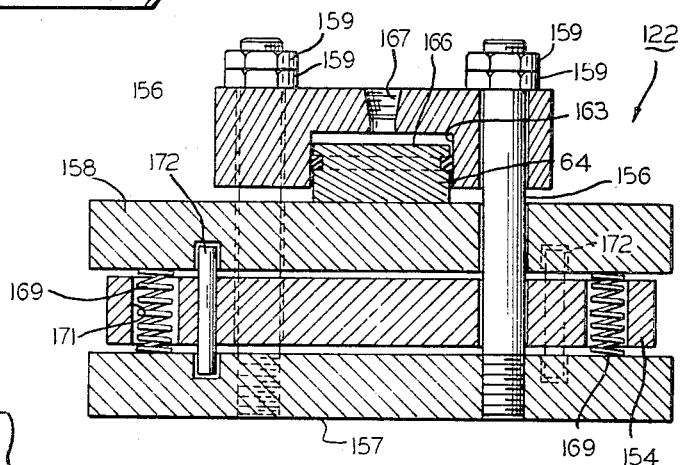
FIG. 17A is a section taken along the line 17A—17A of FIG. 17 looking in the direction of the arrows.

To this end, and as seen particularly in FIGS. 16, 17 and 17A, the cope flask 122 is provided with opposed sides 151 and opposed ends 152, these having mitred corners 153. The mitred corners 153 each abut a corner plate 154 coextensive with a bracket 155 supporting the rollers 124 guided on the vertical rails 123. The sides 151 and the ends 152 of cope flask 122 are held against the corner plates 154 by means of a pair of studs 156 threaded into an abutment 157 at the corner of end member 152 and extending without threaded engagement through corner plate 154 and through an abutment 158 at the mitred corner of side member 151. Pins 156 have locking nuts 159 bearing against a movable cylinder head 162 having a counter bore 163 adapted to receive a piston 164 bearing against abutment 158. Piston 164 has clearance with respect to the cylinder head 162, so that pressure fluid may be introduced to a chamber 166 by means of a drilled passage 167 in cylinder head 162. Passage 167 is tapped to receive a pressure fitting, not shown.

Pressure applied to the chamber 166 holds the sides 151 and the ends 152 to the corner plates 154, but upon release of such pressure the sides 151 and the ends 152 move somewhat laterally as indicated by the arrows seen in FIG. 16. Such lateral movement is achieved by springs 169 held in spring pockets 171 in the corner plate 154 and acting against the abutments 157 and 158. Dowel pins 172 tightly held in the corner plate 154 project with a sliding fit in the abutments 157 and 158 maintain the assembly thus far described in alignment.

In order to provide for accurate closing of the sides and ends of the cope flask 122 against the corner plates 154, the latter are provided with opposed grooves 173 each to receive a closing gasket 174. It may be noted that the structure for causing release of the mould within the cope flask is disposed at opposite diagonal corners of the flask, while the other diagonal corners have the sides and ends joined thereat in a conventional fashion. In such case, the fixed corners are joined rigidly to the corner plate 154 by conventional fastening means extending through the contiguous side and end.

When the drag mould is moved against the cope mould within the cope flask 122 and the pressure is released in the chamber 166 while the drag mould is lightly pressed against the cope mould, the latter rests upon the drag mould and is removed as the ram 28 moves downward. The finished mould now rests upon the bottom board BB upon platen 117.

This marks the end of a moulding operation as has been described. The resumption of a moulding process, the filling of a drag flask and the transfer thereof from Station I to Station II is concomitant with the pushing of the finished mould seen in FIG. 7 on to a conveyor table CT of any convenient kind.

Figure 23:
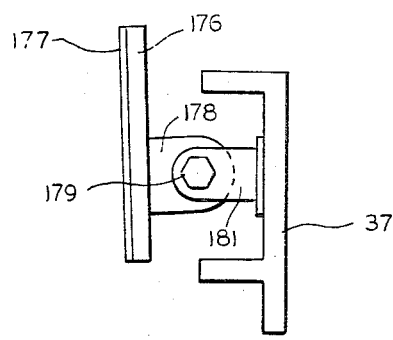
FIG. 23 is a detail of structure mounted on the drag flask for pushing a completed mould from the platen.

In order to push the finished mould from the platen 117 on to the conveyor table CT, the drag flask 37, see FIG. 23, is provided with a pusher member 176 having a resilient facing 177 generally canted, as shown, to match the draft angle of the finished mould. Pusher member 176 has an ear 178 fastened by a yieldable friction pivot pin 179 in turn secured to a bracket 181 extending from the outside of drag flask 37.

It should be understood that the description thus far is predicated upon an assumption that the machine and method according to the present invention has proceeded from a start condition where the machine has been completely cleared.

A brief summary of the steps performed by the apparatus described without the assumption that the machine is starting from a completely cleared position will serve to clarify the operations obtaining by the apparatus according to the invention.

For example, FIGS. 3 and 4 show the movement of the completed drag mould toward the filled cope flask to lightly press against the same, and the thereafter withdrawal of the pressure platen 117 with the finished mould to discharge the same. At this time, and as seen in FIG. 3, the drag flask 37 has been rotated to its inverted position for filling, it being shown in such inverted position also in FIG. 2 ready for filling. As seen in FIG. 2 also, the sand hopper 46 and chute 44 are in alignment to drop a sand charge into drag flask 37 to fill the same, see also FIG. 3. In this latter figure the drag mould is moving with platen 117 toward the filled cope flask 122 to lightly press against the mould therein. Drag mould 37 is resting on its bottom board BB. In FIG. 4 the drag mould is lightly pressing against the cope mould while the sides of cope flask 122 are being opened, and at this time ram 28 is ready to be withdrawn, at which time turnover of the inverted and filled drag flask 37 at Station I takes place. Prior to turnover of the filled drag flask 37, it is covered by the bottom board BB, which is clamped into place before the turnover operation. As seen in FIG. 5 the ram 28 is retracting, and in FIG. 6 the filled and upright drag flask 37 is ready to be moved on to the platen 117.

In this latter view, the car 126 has moved back under the fill hopper 46 to receive in its meter hopper 47 a metered supply of moulding sand for the cope flask 122. As seen in FIG. 7, the filled drag flask 37 with its matchplate is moving toward cope flask 122 to close the bottom thereof, the moulding sand falling into cope flask 122 when gates 53 of meter hopper 47 are opened. FIG. 8 shows the entire flask closed, and FIGS. 9 and 10 show the squeeze head 132 completing the compacting.

FIG. 11 shows the separation after compaction, the sequence being repeated as before described.

It will be understood that proper control mechanism is provided for the aforesaid sequence of operations. Various motor devices have been described in detail for the operation of various mechanisms forming part of the invention, and it will be appreciated that such fluid motors may be either air or oil operated. It will be appreciated also that such motors may be under control of various forms of switches, all in circuits including the usual control elements. The adaptation of control elements to provide the operations and sequencing described is merely incidental to the invention herein.

From the foregoing description it is believed evident that there has been provided a new and useful machine for accomplishing moulding in a continuous operation, and with but a single flask comprised of a drag flask and a cope flask with a single common matchplate. The moulding process is accomplished by the use of the drag flask at a first station where it is filled and turned, and a cope flask located at a second station and cooperating with the drag flask after it has been filled and moved to the second station. The moulding process is also accomplished by a movable metering hopper movable between two positions and having a compacting head thereon which is in compacting position for compacting of the cope and drag flasks after the cope flask has been filled.

Having thus described this invention in such full, clear, concise and exact terms as to enable any person skilled in the art to which it pertains to make and use the same, and having set forth the best mode contemplated of carrying out this invention, the subject matter regarded as being patentable is particularly pointed out and distinctly claimed in what is claimed, it being understood that equivalents or modifications of, or substitutions for, parts of the above specifically described embodiment may be made without departing from the scope of the invention as set forth in what is claimed.

I claim:

1. In a moulding machine, a drag flask having a matchplate mounted thereon, means for filling said flask with moulding material, a board adapted to be moved into position over the contents of said drag flask and to be held thereto, means for turning said drag flask to an upright position and moving said filled drag flask to a second position, with the contents of said drag flask resting on said board, a movable ram member adapted to receive said filled drag flask and to be engaged with said board after said filled drag flask has been moved to said second position, a cope flask adapted to surmount said filled drag flask, said filling means being adapted to fill said cope flask when said matchplate and said drag flask move against said cope flask, and means movable to a position with respect to said cope flask so that upon continued movement of said movable ram the moulding material within said drag and cope flasks will be compacted.

2. The invention of claim 1 wherein said drag flask and matchplate move with said ram member away from said filled cope flask, and where said ram member continues movement with the drag mould with the drag flask arrested in position free from the drag mould, said first named means for moving said drag flask moving the same away from said second position.

3. The invention of claim 2 where said ram member moves toward said filled cope flask with said drag mould thereon after said drag flask has been removed from said second position.

4. The invention of claim 3 wherein said cope mould is provided with sides and ends movable to a position to release the cope mould therein when said ram member moves with said drag mould against said cope mould.

5. The invention of claim 4 wherein said mould is moved from said ram member when a filled drag flask is moved by said drag flask moving means to said second position.

6. The invention of claim 1 wherein said board is held in a hopper for a plurality of boards laid flat therein, and wherein means are provided for lifting all but the bottommost board when the latter is moved into position over said drag flask to minimize friction thereon during movement of said bottommost board into position over said drag flask.

7. The invention of claim 1 wherein the means for moving said drag flask includes means which are released from connection to said drag flask when the same is moved by said ram member toward said cope flask, and are reconnected to said drag flask when said ram member returns to a first position.

8. In a moulding machine, a drag flask having a matchplate mounted thereon, a cope flask spaced from said drag flask, a fill carriage including a metering hopper thereon movable with said fill carriage between positions where said drag flask is filled and said cope flask is filled, said drag flask being filled from said metering hopper while both are at a first position, a supply of flat drag flask covers, means for moving one of said covers into position over said drag flask after the same is filled, while striking off any excess of moulding material, means for securing said cover to said flask, means for rotating said filled drag flask to an upright position, means for moving said filled drag flask to a position of alignment with said cope flask, a ram member adapted to receive said filled drag flask and move the same against said cope flask with the matchplate therebetween, means for moving said fill carriage and said metering hopper to a position to discharge moulding material into said cope flask, said means for moving said fill carriage after such filling returning the fill carriage to said first position, a reaction member mounted on said fill carriage and bearing against the filled cope flask when said fill carriage has returned to its first position, so that upon continued movement of said movable ram the moulding material within said cope and drag flasks will be compacted.

9. The invention of claim 8 wherein said drag flask and matchplate are moved by said ram member away from said filled cope flask, and where said ram member continues movement with the drag mould with the drag flask arrested in position, said means for moving said drag flask moving the same away from said position of alignment to said first position.

10. The invention of claim 9 where said ram member moves toward said filled cope flask with said drag mould thereon after said drag flask is returned to its first position.

11. The invention of claim 10 wherein said cope flask is provided with movable sides and ends movable to a position to release said cope mould when said ram member moves with said drag mould against said cope mould.

12. The invention of claim 11 wherein said mould is moved from said ram member by the movement of a filled drag flask moving from its first position to the position of alignment with said cope flask.

13. The invention of claim 8 wherein said flat drag flask cover is held in a hopper for a plurality of covers laid flat therein, and wherein means are provided for lifting all but the bottommost cover when the latter is moved into position over said flask to minimize friction thereon during movement of said bottommost cover into position over said drag flask.

14. The invention of claim 8 wherein the means for moving said drag flask to said position of alignment with said cope flask includes means which are released from connection to said drag flask when the same is moved by said ram member toward said cope flask and are reconnected to said drag flask when said ram member returns to a first position.

15. In a moulding machine, a rollover device having spaced members adapted to embrace a flask therebetween, a matchplate sceured to said flask, means extending from said members adapted to support said flask and matchplate in an inverted position, a flat drag flask cover adapted to be placed on said inverted drag flask when the same has been filled, and means for clamping said flat drag flask cover and said drag flask together for subsequent rotation of said flask with said rollover device to an upright position comprising means extending from the other side of said spaced members and movable into engagement both with the edges of said flask and said flat drag flask cover.

16. The invention according to claim 15 wherein the means movable into engagement with the edges of said flask and said flat drag flask cover are rollers.

17. The invention according to claim 15 wherein said rollover device is provided with means for supporting the same for rotative movement and a pusher member extends between said spaced members to move the upright flask, matchplate and flat drag flask cover out of engagement with said rollover device.

18. The invention according to claim 17 wherein said flask and pusher member are provided with structure freeing the flask for movement in a direction normal to said member.

19. In a moulding machine, a yoke having spaced arms adapted to embrace a flask therebetween, a matchplate secured to said flask, means extending from said spaced arms adapted to support said flask and matchplate in an inverted position, a flat drag flask cover adapted to be placed on said inverted drag flask when the same has been filled, and means for clamping said flat drag flask cover and said drag flask together for subsequent rotation of said flask with said yoke to an upright position comprising means extending from the other side of said spaced arms and movable into engagement both with the edges of said flask and said flat drag flask cover.

20. The invention according to claim 19 wherein the means movable into engagement with the edges of said flask and said flat drag flask cover are rollers.

21. The invention according to claim 19 wherein said yoke is provided with means for supporting the same for rotative movement, and a pusher member extends through said means to move the upright flask, matchplate and flat drag flask cover out of engagement with said yoke.

22. The invention according to claim 21 wherein said flask and pusher member are provided with structure freeing the flask for movement in a direction normal to said pusher member.

23. In a moulding machine of the type wherein a cope flask and a drag flask are filled with moulding material against a matchplate therebetween, means for moving said drag flask and said matchplate along a path of movement away from said cope flask, means for arresting said drag flask while said last named means continues its movement to remove the drag mould from said drag flask, means for moving said drag flask in a direction laterally of said path of movement whereby said drag mould is free for movement along said path of movement toward the cope mould in said cope flask.

24. A moulding machine according to claim 23 wherein said cope flask is provided with releasable sides to release the cope mould therein when said drag mould is moved along said path of movement to engagement with said cope mould.

25. A moulding machine according to claim 24 wherein a filled drag flask and matchplate move in said lateral direction toward a complete mould consisting of said cope and drag moulds to remove the complete mould from said means moving along said path of movement.

References Cited
UNITED STATES PATENTS

| | | | |
|---|---|---|---|
| 1,768,359 | 6/1930 | Hazell | 164—182 |
| 2,640,234 | 6/1953 | Bergami | 164—193 |
| 2,695,432 | 11/1954 | Young | 164—340 |
| 2,850,775 | 9/1958 | Northington et al. | 164—1 |
| 2,904,858 | 9/1959 | Pinchon | 164—168 |
| 3,192,579 | 7/1965 | Lubalin | 164—18 |

FOREIGN PATENTS

| | | |
|---|---|---|
| 204,414 | 11/1908 | Germany. |
| 46,380 | 4/1929 | Norway. |

J. SPENCER, OVERHOLSER, *Primary Examiner.*

E. MAR, *Assistant Examiner.*